United States Patent [19]

Snow

[11] Patent Number: 4,831,877
[45] Date of Patent: May 23, 1989

[54] ADJUSTABLE LIQUID LEVEL INDICATOR

[75] Inventor: A. Ray Snow, Sandy, Utah

[73] Assignee: Chain-Tool Company, Inc., North Salt Lake, Utah

[21] Appl. No.: 87,775

[22] Filed: Aug. 21, 1987

[51] Int. Cl.[4] .............................................. G01F 23/00
[52] U.S. Cl. ............................... 73/290 R; 73/864.63;
116/227
[58] Field of Search ........ 73/DIG. 3, DIG. 5, 290 R,
73/290 V, 298, 304 C, 307, 308, 313, 314, 315,
318, 319, 321, 322, 322.5, 323, 293, 864.61,
864.63; 116/227, 228; 33/126.4 R, 126.7 R,
126.7 A; 340/612, 618, 623, 59, 605, 624, 60,
620; 184/6.4, 1.5; 123/229, 233, 196 S;
200/61.2, 84 R; 137/558; 307/10

[56] References Cited

U.S. PATENT DOCUMENTS

| | | |
|---|---|---|
| 1,241,384 | 9/1917 | Hueber . |
| 1,368,187 | 2/1921 | Murphy . |
| 1,526,376 | 2/1925 | Rosenmund . |
| 1,644,415 | 10/1927 | Cosgro ............................. 73/864.63 |
| 1,792,754 | 2/1931 | Myers . |
| 1,864,472 | 6/1932 | Riebeling ......................... 73/864.63 |
| 1,880,868 | 10/1932 | Lancey ............................. 73/864.63 |
| 2,333,711 | 11/1943 | Dwiggins ..................... 73/864.63 X |
| 2,539,604 | 1/1951 | Woolley . |
| 2,660,058 | 11/1953 | Vogt . |
| 3,311,984 | 4/1967 | Stux et al. . |
| 3,662,470 | 5/1972 | Sasgen . |
| 3,834,236 | 9/1974 | Durin . |
| 3,935,835 | 2/1976 | Rinck . |
| 3,972,234 | 8/1976 | Osojnak . |
| 4,055,898 | 11/1977 | Braun et al. . |
| 4,235,186 | 11/1980 | Frobose . |
| 4,649,746 | 3/1987 | Snow . |

FOREIGN PATENT DOCUMENTS

| | | |
|---|---|---|
| 832457 | 9/1938 | France . |
| 1189271 | 10/1959 | France . |
| 526238 | 7/1955 | Italy . |
| 1155877 | 6/1969 | United Kingdom . |

*Primary Examiner*—William M. Shoop, Jr.
*Assistant Examiner*—Paul Ip
*Attorney, Agent, or Firm*—Mallinckrodt & Mallinckrodt

[57] ABSTRACT

In a device for indicating the level of a liquid in a reservoir of the type which has a liquid receiving area to be positioned partially within the liquid in the reservoir, a liquid confinement tube within the liquid receiving area which may be moved from a liquid unconfining position to a liquid confining position when it is desired to measure the level of the liquid in the reservoir, a piston within the liquid confinement tube coupled to an indicator located outside the reservoir such that movement of the indicator causes movement of the piston within the confinement tube, the amount of movement of the piston and indicator indicating the level of fluid within the reservoir, and a spacer tube determining the length between the liquid receiving area and the indicator, the improvement of making the device adjustable over a range of lengths. To make the device adjustable, the spacer tube is length adjustable and may include telescoping tubes, and the coupling between the piston and indicator is also length adjustable, the coupling being released while adjustment of the spacer tube takes place. It is also preferable to secure the confinement means in unconfining position during the adjustment of the device. When the device replaces a dipstick in a liquid reservoir, the invention includes a method of adjusting the length of the device by aligning portions of the device with corresponding portions of the dipstick.

20 Claims, 1 Drawing Sheet

U.S. Patent May 23, 1989 4,831,877
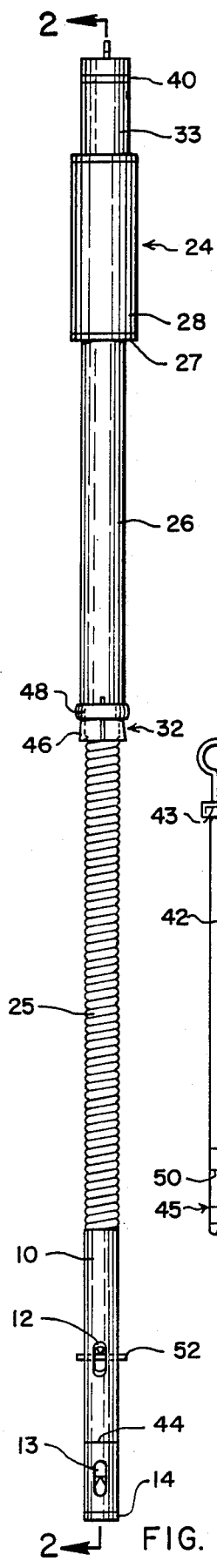
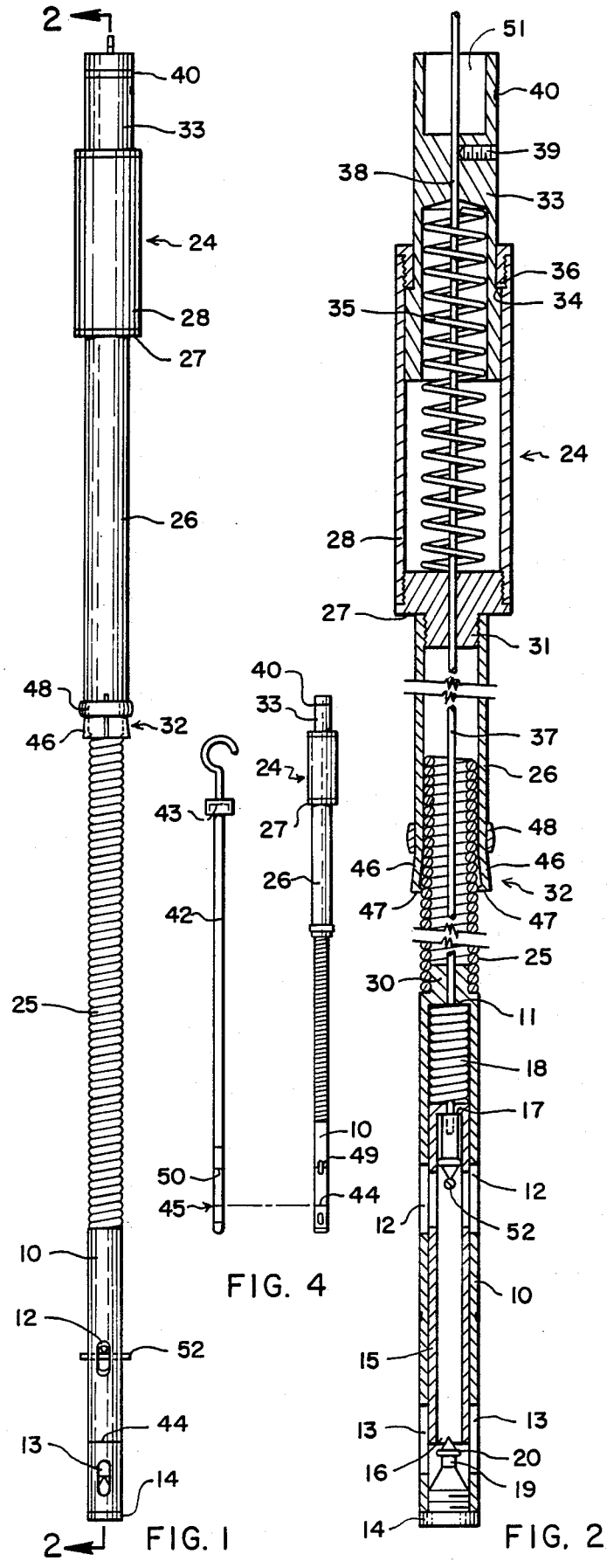
FIG. 1  FIG. 2  FIG. 3  FIG. 4

ADJUSTABLE LIQUID LEVEL INDICATOR

BACKGROUND OF THE INVENTION

1. Field

The invention is in the field of devices for measuring the liquid level in a liquid reservoir such as measuring the level of oil in the crankcase of an engine or the level of transmission fluid in a transmission.

2. State of the Art

U.S. Pat. No. 4,649,746 discloses a device for measuring the liquid level in a liquid reservoir and shows as an example the device used to measure the level of oil in the crankcase of an engine. The device takes the place of the normal dipstick commonly used to measure oil level and fits into the engine dipstick tube in place of the dipstick. The device has a plunger extending from the top thereof which is depressed by the user, the extent to which the plunger can be depressed indicating the level of the oil in the engine. This gives an easy means for measuring oil level and avoids having to remove and clean the dipstick. It is also much easier to read than dipsticks generally are.

While the device of U.S. Pat. No. 4,649,746 operates very well and has a number of advantages over the normal dipstick, practically, most engines require different length dipsticks and thus, require different lengths for the dipstick replacement device of the patent. This creates a problem because in the automotive after-market, products must fit a number of different vehicles as the inventory required to stock a size for each vehicle is much too large for most dealers to handle. Thus, to make the device of U.S. Pat. No. 4,649,746 practical for the automotive after-market, it is necessary that the device be adjustable over at least a limited range of lengths so that a single device may be adjusted to fit a variety of different engines.

SUMMARY OF THE INVENTION

According to the invention, a liquid level indicating device of the type disclosed in U.S. Pat. No. 4,649,746 is made adjustable in length over at least limited ranges of lengths so that such a device can be adjusted for use in a number of different engines. The device, when purchased, would be placed alongside the dipstick removed from the vehicle into which the replacement device is to be inserted, and the length of the device adjusted based upon the length of the dipstick. The length of the device is then locked, the device placed into operable condition, and placed in the engine in the dipstick tube in place of the dipstick.

The device of U.S. Pat. No. 4,649,746 includes liquid receiving means adapted to be mounted in the reservoir partially within the liquid therein so that liquid flows into the receiving means. Liquid confinement means is provided cooperable with the liquid receiving means to move between an unconfining position wherein the liquid is free to flow into or out of the confinement means and the amount of liquid in the confinement means is representative of the level of liquid in the reservoir at any time and varies as the level of the liquid in the reservoir varies and a confining position wherein the amount of liquid in the confinement means is representative of the liquid in the reservoir at the time the confinement means is moved into confining position and such liquid is confined to and cannot flow from the confinement means. The confinement means is normally held in unconfining position and is moved into confining position when it is desired to measure the level of the liquid. Piston means is provided cooperable with the confinement means for movement therein, the amount of movement being limited by the liquid confined in the confinement means so the amount of movement is proportional to and an indication of the liquid level in the reservoir. The piston means is coupled to an indicator means cooperable with an indicator means housing such that movement of the indicator means causes movement of the piston. Since the amount of movement of the piston in the confinement means is an indication of the level of liquid in the reservoir, the amount of movement of the indicator coupled to the piston is also an indication of the level of liquid in the reservoir. The indicator is spaced from the piston means, confinement means, and liquid receiving means by spacing means so that while the liquid receiving means is located partially in the liquid whose level is to be measured, the indicator means is located exteriorly of the reservoir and is accessible to the user. The user then moves the indicator means which is calibrated so that the extent of movement is visible to the user and indicates the level of liquid in the reservoir. The spacer means usually takes the form of a tube of fixed length and the coupling means is usually a wire or cable of fixed length secured to the piston at one end and secured to the indicator at the other end. There is no way to adjust the distance between the liquid receiving means at one end of the tube and the indicator means at the other end.

With the present invention, the spacer means is made adjustable and, for example, may take the form of telescoping tubes. Means are provided for locking the telescoping tubes together once the proper length is set thereby fixing the length of the spacer and the length of the device. The coupling means between the piston and indicator is releasable so that the coupling means is released during adjustment of the spacer and once the adjustment is completed, the coupling means is locked to couple the piston and indicator. The coupling of the piston and indicator should take place with the confinement means in its unconfining position and with the piston means at the nonmeasuring extreme of its travel. Therefore, it is preferred to provide means, such as a pin, for holding the confinement means in its unconfining position and the piston in the unmeasuring extreme of its travel until the coupling means is locked to couple the piston to the indicator.

THE DRAWINGS

In the accompanying drawings, which illustrate a presently preferred embodiment of the invention:

FIG. 1 is a side elevation of a device of the invention as it might be purchased in unadjusted form with maximum length;

FIG. 2, a vertical section of the device of FIG. 1 taken on the line 2—2 and drawn to a larger scale and showing some intermediate portions of the device broken out;

FIG. 3, a vertical section similar to that of FIG. 2, but showing the device after the length thereof has been adjusted and showing the device in measuring condition; and FIG. 4, a side elevation of a device of the invention alongside a dipstick which the device of the invention will replace and to which it has been calibrated.

DETAILED DESCRIPTION OF THE ILLUSTRATED EMBODIMENT

The invention will be described as applied to a liquid measuring device of the type disclosed in U.S. Pat. No. 4,649,746. In such a device, a tubular member 10 having an upper shoulder 11, a set of upper ports 12, and a set of lower ports 13 forms a liquid receiving means which is adapted to be mounted in the reservoir partially within the liquid therein. The positioning in the reservoir is such that upper ports 12 remain above the normally expected full liquid level and the lower ports 13 are below the normally expected low liquid level. The bottom of tubular member 10 is closed by a plug 14 threaded into the bottom end of tubular member 10.

Within tubular member 10 is a second tubular member 15 of smaller diameter. Second tubular member 15, which forms a fluid confinement means, has an open bottom 16 and an upper shoulder 17 and is free to move upwardly or downwardly within tubular member 10. A spring 18 between shoulder 11 of tubular member 10 and shoulder 17 of tubular member 15 biases member 15 downwardly toward the bottom plug 14 of tubular member 10. When in its down position, as shown in FIG. 3, a sealing projection 19 with O-ring 20 thereon extending upwardly from bottom plug 14 fits into the open lower end of tube 15 to seal the bottom thereof.

A piston 21 with sealing O-ring 22 is slideably mounted within tube 15 and a set of ports 23 are provided near the upper end of tube 10 but below piston 21 when piston 21 is against upper shoulder 17 of tube 15.

Tubular member 10 is mounted and positioned in the liquid reservoir by a spacer means which connects it to an indicator housing 24 which is mounted in an accessable position outside the liquid reservoir. In the present invention, as shown, the spacer means comprises telescoping tubes 25 and 26 which secure tubular member 10 in spaced relationship to indicator housing 24. Indicator housing 24 has lower shoulder 27 threaded into tube 28 which, when the invention is used to measure oil level in an engine, will normally rest on top of the usual engine dipstick tube 29, FIG. 3. In the device of U.S. Pat. No. 4,649,746, a single, fixed length tube is used as the spacer rather than adjustable telescoping tubes 25 and 26 and the use of such telescoping tubes in place of the fixed length tube is part of the present invention. As shown, tubular member 10 is secured to an end of spacer tube 25 by means of threaded collar 30 which is an integral part of and extends from the top of shoulder 11. Indicator housing 24 is secured to an end of spacer tube 26 by means of a threaded collar 31 which is an integral part of and extends from the bottom of shoulder 27. The telescoping tubes 25 and 26 are held in fixed relation to each other by clamp 32.

A plunger 33 with lower shoulder 34 is positioned in tube 28 of indicator housing 24 with a spring 35 between shoulder 27 and plunger 33 to thereby bias plunger 33 upwardly in housing 24. Plunger 33 is held in housing 24 by means of a shoulder 36 threaded into the top of tube 28 against which plunger shoulder 34 abuts under urging of spring 35, FIG. 2. Plunger 33 forms an indicator means for the device. A wire or cable 37 extends from securement to piston 21 through spacer tubes 25 and 26 and indicator housing 24 through a receiving opening 38 in plunger 33. A set screw 39 provides a means to secure or lock plunger 33 to wire 37. When thus secured, movement of plunger 33 causes movement of piston 21.

In operation of the device, with tubular member 10 in the liquid in the reservoir as shown in FIG. 3, and with tubular member 15 in its unconfining position as shown in FIG. 2, fluid enters tubular members 10 and 15 and because of venting through ports 12 and 23, reaches a level in the tubes corresponding to the liquid level in the reservoir. When it is desired to measure the fluid level, a user depresses plunger 33. The movement of plunger 33 is transmitted through wire 37 to piston 21 which moves downwardly a distance equal to the downward movement of plunger 33. As will be noted from FIG. 3, as the plunger is depressed, spring 18 causes confinement tube 15 to move downwardly with piston 21 until its lower end is sealed by sealing projection 19. At this time, fluid proportional to the level of fluid in the reservoir is confined in tube 15. As piston 21 continues its downward movement, it moves within tube 15 to first cover ports 23 and then to move to the top of the liquid. Since the liquid in tube 15 is noncompressible and is confined in tube 15, piston 21 will stop when it reaches the top of the liquid. This causes plunger 33 to also stop. The user notes the position at which plunger 33 stops and this provides an indication of the level of liquid in the reservoir. Depending upon the user of the device, plunger 33 will be calibrated in an appropriate manner. For use in measuring the oil level in an engine, the plunger may merely have a single line calibration 40 which indicates that a quart of oil should be added. Thus, if plunger 33 is depressed so that line 40 is at the top edge of indicator housing 24 as shown in FIG. 3 or within housing 24, a quart of oil should be added. If the line is above the housing, the oil level is still in the safe zone. Upon release of plunger 33, spring 35 causes plunger 33 to move upwardly to the position shown in FIGS. 1 and 2 and pulls both piston 21 and confinement tube 15 upwardly against spring 18 causing spring 18 to compress. This upward movement of piston 21 moves it to the extreme of its upward or unmeasuring movement. It will be noted that for such operation, the upward force exerted by spring 35 must be greater than the downward force exerted by spring 18.

The device as shown in U.S. Pat. No. 4,649,746 is fixed length. Being of fixed length, separate devices of different fixed lengths are needed to replace each different length dipstick used in the many different automobile engines on the highway today. This creates a manufacturing problem and stocking problem if these devices are to be made available to the automotive aftermarket as replacements for the usual dipstick. A device similar that of U.S. Pat. No. 4,649,746, but adjustable in length was needed. The problem encountered by the inventor in making a length adjustable device was that the length of the device is determined not only by the length of the spacer means but also by the length of the coupling means. In addition, springs 18 and 35 work in opposition to one another. All of these factors have to be dealt with in making an adjustable device and one cannot merely make the spacer tube adjustable without taking into account and making wire 37 coupling plunger 33 and piston 21 also adjustable which then causes a problem in terms of keeping one of springs 18 or 35 compressed while the other is extended. The adjustment must also be done in a manner which can be understood and performed by an ordinary consumer.

With the device of the present invention, the spacer tube is made up of two telescoping tubes 25 and 26 which provide for adjustment of the length of the spacer. Tube 25 may be moved within tube 26 to provide a range of adjustment between a maximum length as shown in FIGS. 1 and 2 and a minimum length, not shown, where the upper end of tube 25 abuts collar 31 or alternatively wherein tube 25 is substantially completely received within tube 26. Which of these conditions determines the minimum length depends upon the relative lengths of tubes 25 and 26. An intermediate adjustment is shown in FIG. 3. The adjustment will generally be accomplished by taking an unadjusted unit, such as in FIG. 1 and positioning it on a surface, such as a workbench, next to the dipstick 42 it is to replace, see FIG. 4. Shoulder 27 of the indicator housing is aligned with the shoulder 43 of the dipstick which nroamlly rests on the top of the dipstick tube and tubes 25 and 26 are adjusted until a mark such as mark 44 on tubular member 10 is aligned with the line 45 on the dipstick indicating that a quart of oil should be added. At this point, clamp 32 is operated to lock tubes 25 and 26 together and thereby lock the correct length into the device. Clamp 32 may be formed as an integral part of the end of tube 26 by forming fingers 46 at the end of tube 26, each of fingers 46 having teeth 47 extending inwardly therefrom to fit between adjacent windings of the wire forming tube 25. During adjustment, fingers 46 flex to allow tube 25 to move with respect to tube 26. When the proper length adjustment is reached, ring 48 is moved down over fingers 46, FIG. 3, to keep them from flexing outwardly and thereby locking tubes 25 and 26 in positio. Of course, various other types of clamping devices may be used to secure tube 25 to tube 26. Also, rather than a mark on tubular member 10 to be aligned with the add one quart line of the duipstick, a mark 49 could be provided to be aligned with the full line 50 on the dipstick or to correspond with any other indicator on the dipstick.

During the adjustment of tubes 25 and 26, set screw 39 in plunger 33 is loose so that wire 37 freely slides within receiving hole 38. This wire has to be long enough so that at maximum length of the spacer means, i.e. maximum extension of tubes 25 and 26, the wire will still pass through receiving hole 38. After the positions of tubes 25 and 26 are locked in place, set screw 39 is tightened to thereby lock wire 37 and thus couple piston 21 to plunger 33. Various types of wire may be used for wire 21 such as, for example, piano wire or a flexible stranded or braided cable such as used to operate hand brakes on bicycles. Where a relatively stiff wire is used, once the length of the device is adjusted, any wire extending from the upper end of plunger 33 may be cut off and discarded. Where a flexible cable is used, the length of cable extending from the end of plunger 33 may merely be coiled and rest in the top portion 51 of plunger 33.

Because springs 35 and 18 work in opposition to one another, it is important for proper operation of the device that when wire 37 is secured to plunger 33 with plunger 33 in extended condition, as shown in FIGS. 1 and 2, spring 18 be fully compressed as shown in FIG. 2. It is thus necessary that spring 18 be compressed before set screw 39 is tightened. In most instances, this compression of spring 18 can be accomplished by pulling wire 37 to cause compression of spring 18. However, since this may be difficult for some people to do, and also, since it is difficult to tighten set screw 39 while at the same time holding the device and pulling on wire 37, it is preferred, as shown in FIGS. 1 and 2, to provide, when in unset position, such as when purchased, a pin 52 extending through tubular member 10, tubular member 15 and just below piston 21 to lock tubular member 15 and piston 21 in position at the extreme of its upward or unmeasuring travel with spring 18 compressed. After set screw 39 is tightened, pin 52 is removed and the device is then ready for use. It is then inserted into the engine dipstick tube from which the dipstick has been removed.

While the present invention has been described in connection with an embodiment of the device shown in U.S. Pat. No. 4,649,746, the invention would be equally applicable to the various other embodiments shown in that patent as well as to other similar devices. Also, while various materials have been disclosed for use with the invention such as a flexible plastic material for tube 26 and a coiled wire for tube 25, various other materials could also be used.

The device described herein has been described for use in measuring the level of oil in an engine crankcase and to replace the usual oil dipstick. However, the device may be used in numerous other applications such as to measure transmission fluid level or power steering fluid level wherein the device could be made to replace the normally used dipsticks in those applications or could be mounted in various other ways in other liquid reservoirs where liquid level is to be monitored.

With the invention shown, the length adjustment will not be unlimited. While two telescoping tubes have been shown and described, more than two tubes could be used to increase the length of adjustment of the device. In commercial production, various models using two tubes will be available to adjust over various lengths. Thus, for example, one model may be adjustable between eight and twelve inches, another model adjustable between twelve and nineteen inches, and a third model adjustable between nineteen and thirty-six inches. Since for the embodiment shown, everything below indicator means housing 24 must fit into a dipstick tube, the diameter of all such tubes must be small enough to fit into the dipstick tube and must be flexible enough to follow any bends in such tubes. The drawings herewith exaggerate the diameter of the tubes below the indicator means housing in order to show them and the parts within them clearly. Also, while the device in its unadjusted form is shown as fully extended to maximum length, the device can be supplied in unadjusted form with tubes telescoped to minimum length. This will be particularly appropriate where a flexible cable is used for the coupling means and the extra length can be coiled and stored in the open top portion 51 of plunger 33.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Apparatus for indicating the level of a liquid in a reservoir comprising liquid receiving means adapted to be mounted in the reservoir partially within the liquid therein so that liquid flows into said receiving means; liquid confinement means cooperable with said liquid receiving means to move between an unconfining position and a confining position to confine an amount of liquid within said confinement means representative of the level of liquid within the reservoir when it is desired to measure the level of liquid within the reservoir; piston means cooperable with the confinement means for movement therein, the amount of movement being limited by the amount of liquid confined in the confinement means and thus being proportional to the level of the liquid in the reservoir; an indicator housing means; indicator means located outside the liquid reservoir and mounted for movement within the indicator housing means; length adjustable spacer means connecting the liquid receiving means and the indicator housing means; means for locking the length adjustment of the spacer means when the spacer means has been adjusted for the desired length; and coupling means releasably coupling the indicator means and the piston means so that movement of the indicator means is proportional to movement of the piston means and is thus proportional to the level of the liquid in the reservoir and whereby the coupling means is released during length adjustment of the spacer means.

2. Apparatus according to claim 1, wherein the length adjustable spacer means is a pair of tubes, one tube of the pair telescoping into the other tube of the pair and moveable therein so that the length of the spacer may be adjusted.

3. Apparatus according to calim 2, wherein the inner telescoping tube is formed of coiled wire.

4. Apparatus according to claim 3, wherein the means for locking the length adjustment is clamp means mounted on the outer telescoping tube having teeth thereon adapted to be clamped into the inner telescoping tube when it is desired to lock the length adjustment.

5. Apparatus according to claim 4, wherein the outer telescoping tube is formed of a flexible plastic material.

6. Apparatus according to claim 1, wherein the length adjustable spacer means is a plurality of telescoping tubes.

7. Apparatus according to claim 1, wherein the coupling means releaseably coupling the indicator means and the piston means is a cable secured to the piston means and releaseably secured to the indicator means.

8. Apparatus according to claim 7, wherein the cable passes through a receiving opening in the indicator means and a set screw releasably secures the cable to the indicator means.

9. Apparatus according to claim 1, wherein means is additionally provided for holding the confinement means in unconfining position within the receiving means when the coupling means is released.

10. Apparatus according to claim 9, wherein the means for holding the confinement means in unconfining position is a pin extending through the receiving means and confinement means and positioned to hold the piston means at the extreme of its unmeasuring movement.

11. In an apparatus for indicating the level of a liquid in a reservoir including liquid receiving means adapted to be mounted in the reservoir partially within the liquid therein so that liquid flows into said receiving means, liquid confinement means cooperable with said receiving means to move between an unconfining position and a confining position to confine an amount of liquid within the confinement means representative of the level of liquid within the reservoir when it is desired to measure the level of liquid within the reservoir, piston means cooperable with the confinement means for movement therein, the amount of movement being limited by the amount of liquid in the confinement means and therefore being proportional to the level of liquid in the reservoir, indicator means, coupling means coupling said piston means to said indicator means such that movement of the indicator means causes movement of the piston means, the amount of movement of the indicator means being indicative of the level of liquid in the reservoir, and spacing means separating the indicator means from the receiving means, the improvement wherein the spacing means is adjustable to provide an adjustable range of spacings between the receiving means and the indicator means, wherein the coupling means releasably couples the piston means and the indicator means so that the coupling between the piston means and the indicator means may be released during adjustment of the spacing means, and wherein there is additionally included means for locking the adjustable spacing means in adjusted position.

12. Apparatus according to claim 11, wherein the length adjustable spacer means is a pair of tubes, one tube of the pair telescoping into the other tube of the pair and moveable therein so that the length of the spacer may be adjusted.

13. Apparatus according to claim 12, wherein the inner telescoping tube is formed of coiled wire and wherein the means for locking the length adjustment is clamp means mounted on the outer telescoping tube having teeth thereon adapted to be clamped into the inner telescoping tube when it is desired to lock the length adjustment.

14. Apparatus according to claim 11, wherein the length adjustable spacer means is a plurality of telescoping tubes.

15. Apparatus according to claim 11, wherein the coupling means releaseably coupling the indicator means and the piston means is a cable secured to the piston means and releaseably secured to the indicator means.

16. Apparatus according to claim 15, wherein the cable passes through a receiving opening in the indicator means and a set screw releaseably secures the cable to the indicator means.

17. Apparatus according to claim 11, wherein means is additionally provided for holding the confinement means in unconfining position within the receiving means when the coupling means is released.

18. Apparatus according to claim 17, wherein the means for holding the confinement means in unconfining position is a pin extending through the receiving means and confining means and positioned to hold the piston means at the extreme of its unmeasuring movement.

19. A method for adjusting and calibrating the length of an apparatus for indicating the level of a liquid in a reservoir which liquid level is usually measured by use of a dipstick and wherein the apparatus is adapted to replace the dipstick in a dipstick tube and wherein the apparatus includes liquid receiving means adapted to be mounted in the reservoir partially within the liquid therein so that liquid flows into said receiving means and said receiving means having a calibrating mark thereon, liquid confinement means cooperable with said liquid receiving means to move between an unconfining position and a confining position to confine an amount of liquid within said confinement means representative of the level of liquid within the reservoir when it is desired to measure the level of liquid within the reservoir, piston means cooperable with the confinement means for movement therein, the amount of movement being limited by the amount of liquid confined in the confinement means and thus being proportional to the level of the liquid in the reservoir, an indicator housing means defining a portion of the apparatus adapted to rest on top of a dipstick tube, indicator means located outside the liquid reservoir and mounted for movement within the indicator housing means, length adjustable spacer means connecting the liquid receiving means and the indicator housing means, means for locking the length adjustment of the spacer means when the spacer means has been adjusted for the desired length, and coupling means releaseably coupling the indicator means and the piston means so that movement of the indicator means is proportional to movement of the piston means and is thus proportional to the level of the liquid in the reservoir and whereby the coupling means is released during length adjustment of the spacer means, comprising the steps of placing the dipstick which the apparatus is to replace beside the apparatus, said dipstick having a portion thereof adapted to rest on top of a dipstick tube and having at least one mark thereon to indicate liquid level; aligning the portion of the apparatus which is adapted to rest on the top of the dipstick tube with the portion of the dipstick adapted to rest on the top of the dipstick tube; with the coupling means released and while maintaining the alignment of the portion of the apparatus which is adapted to rest on the top of the dipstick tube with the portion of the dipstick adapted to rest on the top of the dipstick tube, adjusting the length of the spacer means to align the calibrating mark on the liquid receiving means with a predetermined appropriate mark on the dipstick; locking the spacer means to lock the length adjusted; ensuring that the confinement means is in its unconfining position and that the piston means is at the maximum of its unmeasuring stroke; and locking the coupling means.

20. A method of adjusting and calibrating the length of an apparatus for indicating the level of a liquid in a reservoir according to claim 19, wherein the apparatus additionally includes means for holding the confinement means in unconfining position and the piston means at the extreme of its unmeasuring movement during adjusting and calibrating, additionally including the step of releasing said holding means after the step of locking the coupling means.

* * * * *